Figure 7:
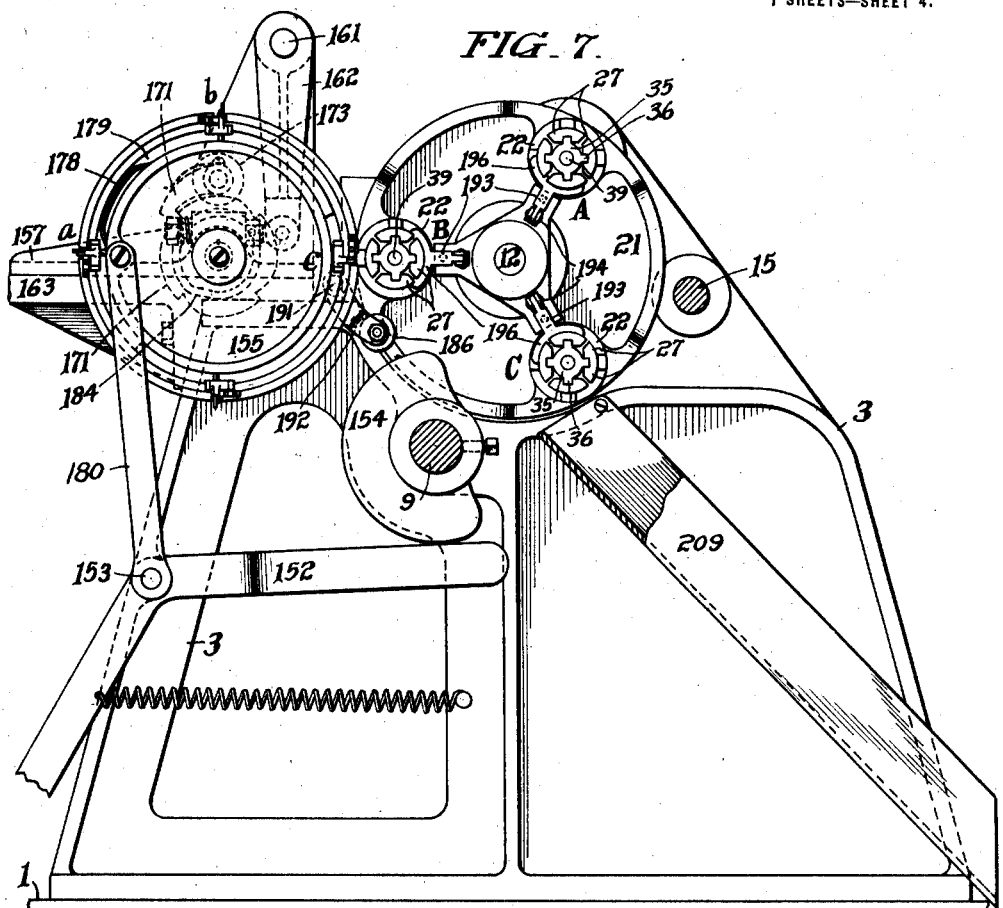

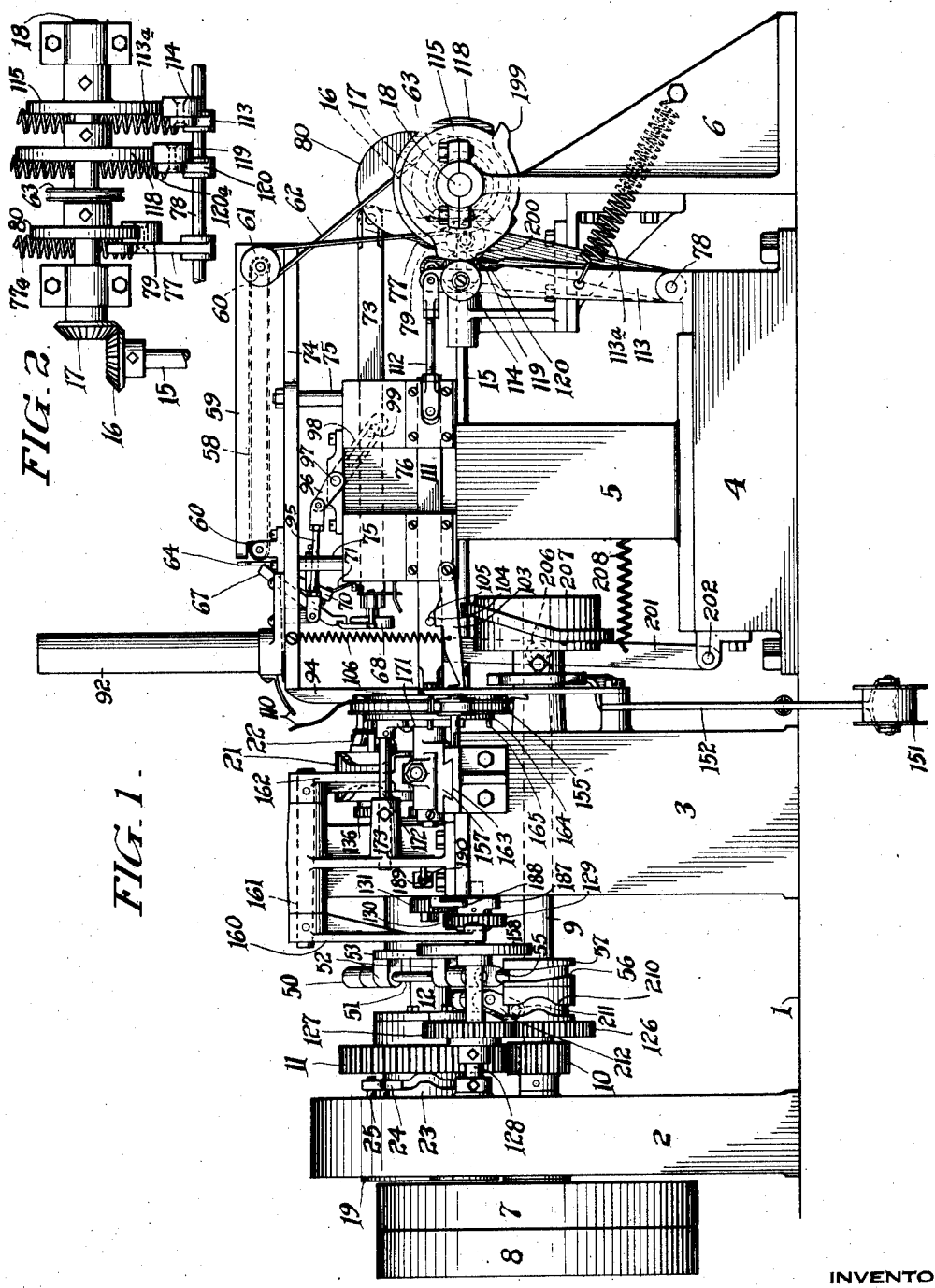

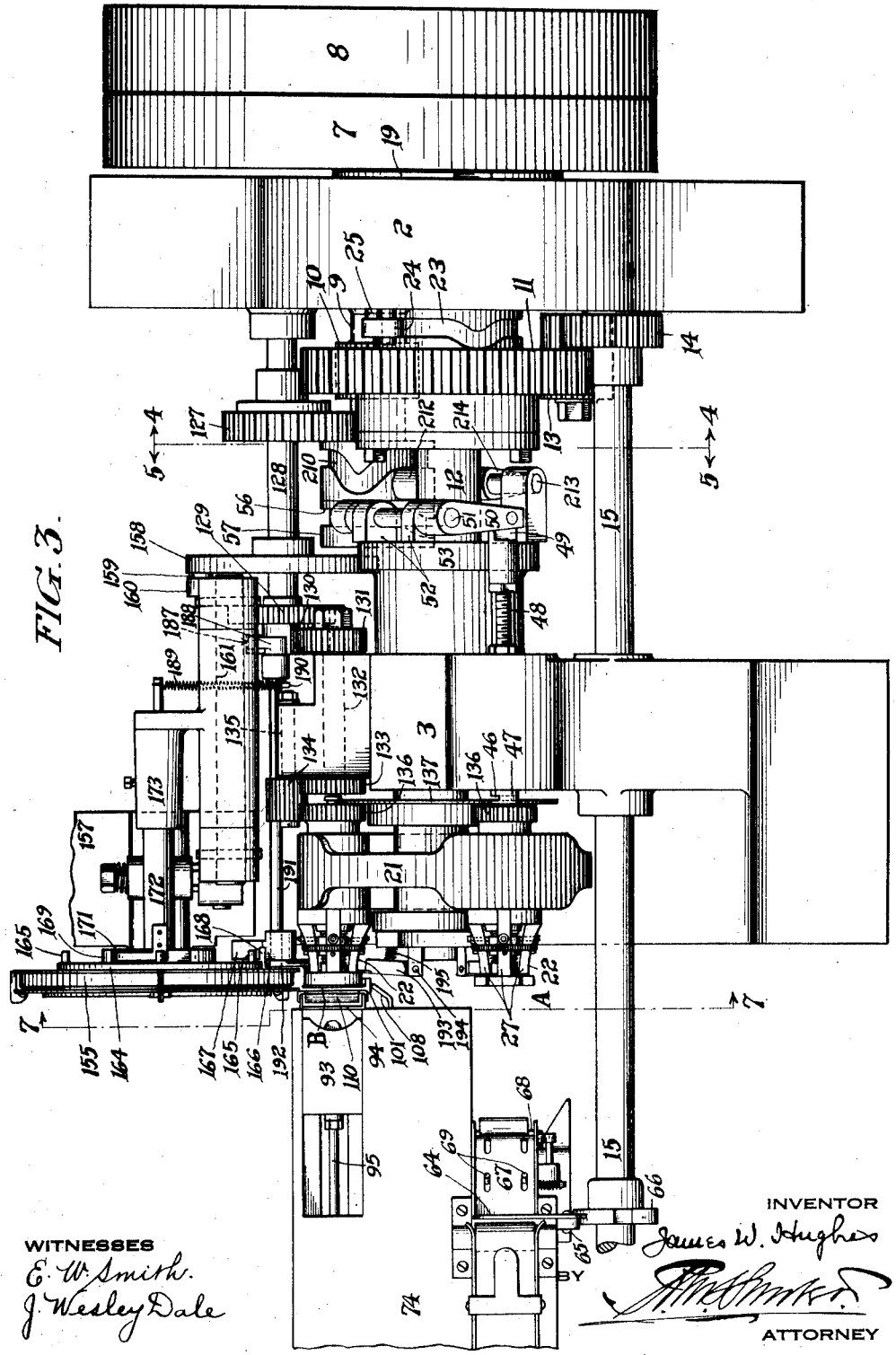

J. W. HUGHES.
BOX MAKING MACHINE.
APPLICATION FILED DEC. 4, 1915.
1,401,407.
Patented Dec. 27, 1921.
7 SHEETS—SHEET 3.
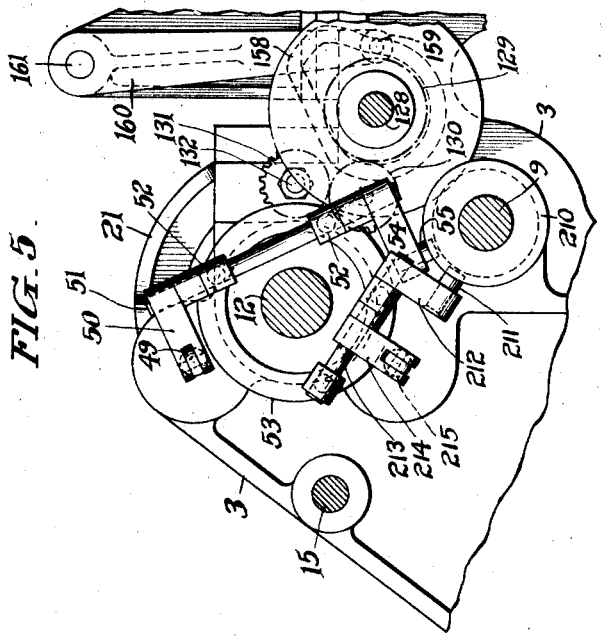
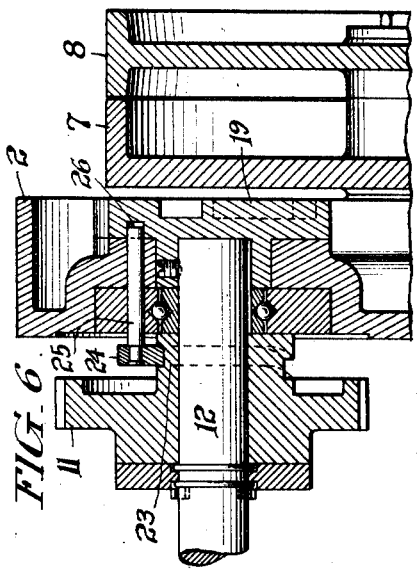
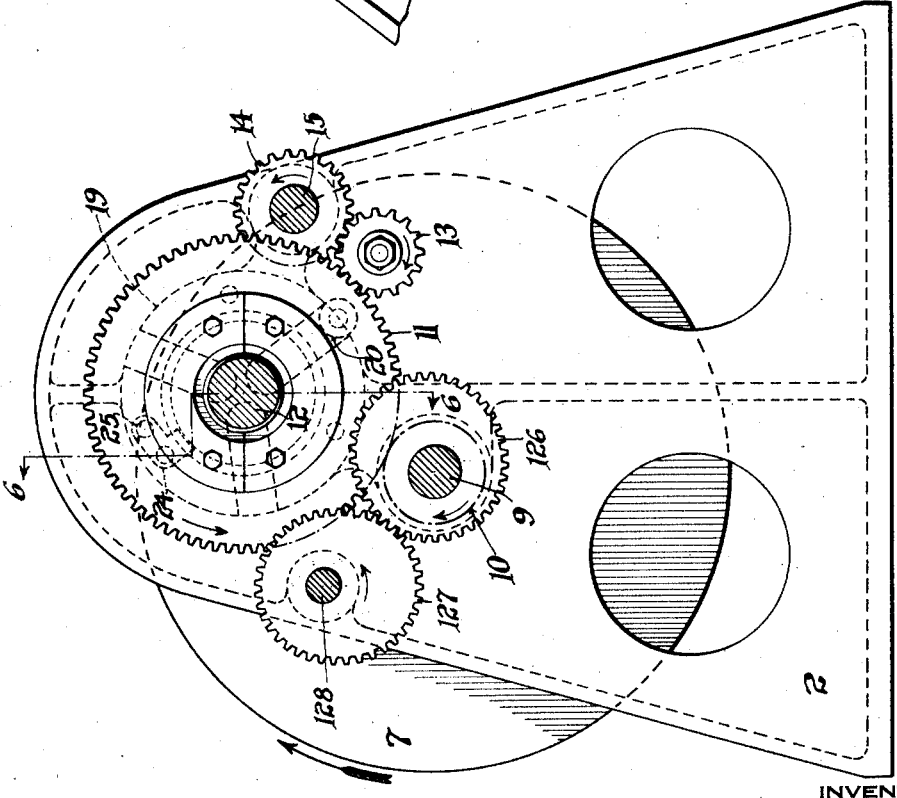
WITNESSES
E. W. Smith
J. Wesley Dale
INVENTOR
James W. Hughes
BY
ATTORNEY

J. W. HUGHES.
BOX MAKING MACHINE.
APPLICATION FILED DEC. 4, 1915.

1,401,407.

Patented Dec. 27, 1921.
7 SHEETS—SHEET 4.

WITNESSES
E. W. Smith.
J. Wesley Dale

INVENTOR
James W. Hughes
BY
ATTORNEY

J. W. HUGHES.
BOX MAKING MACHINE.
APPLICATION FILED DEC. 4, 1915.
1,401,407.
Patented Dec. 27, 1921.
7 SHEETS—SHEET 5.
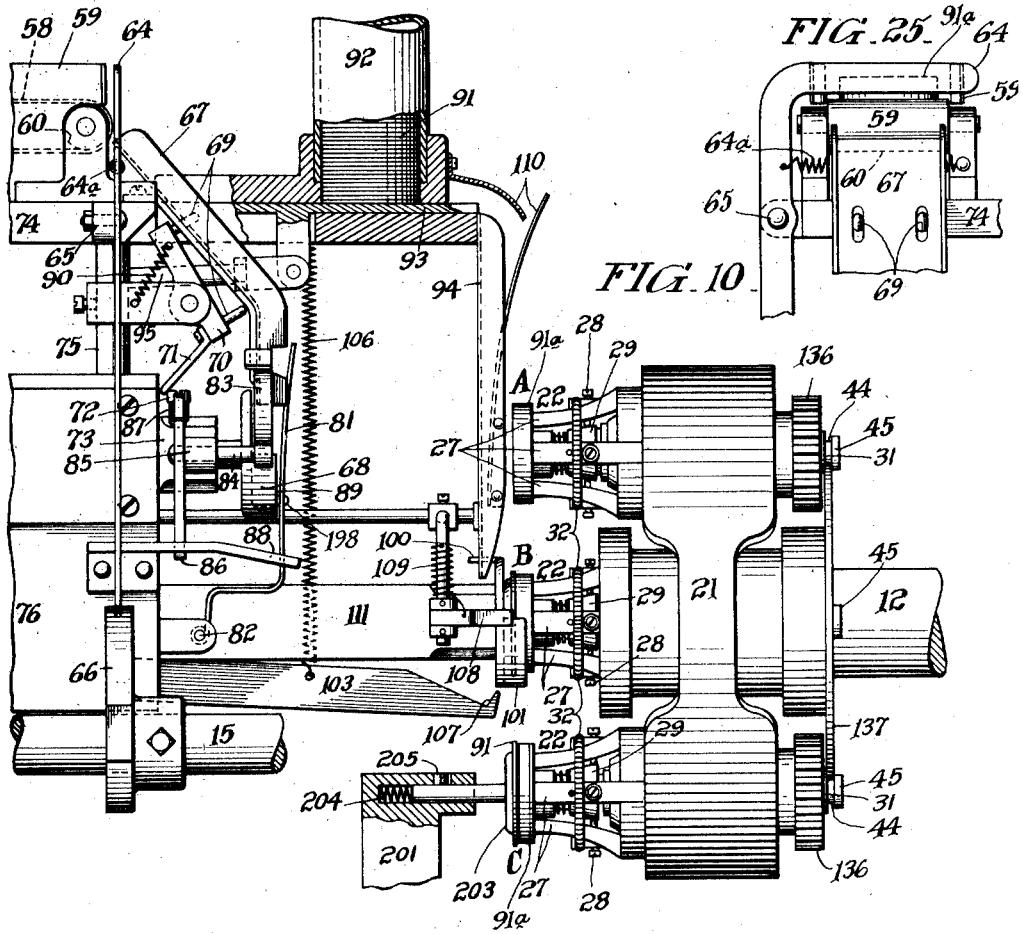
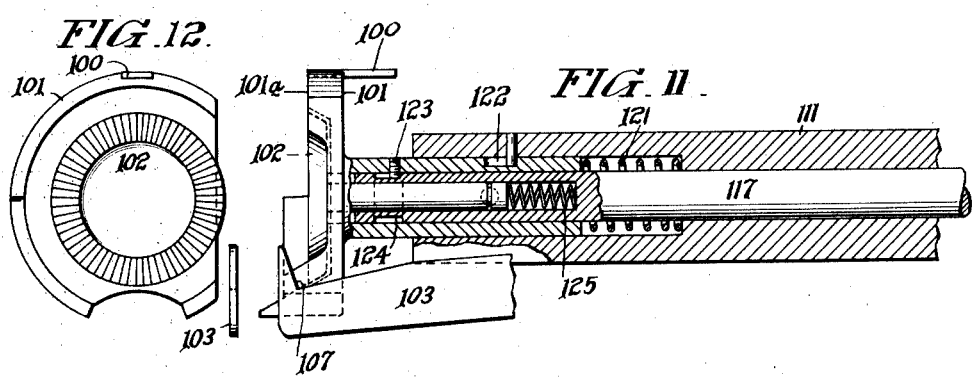
WITNESSES
E. W. Smith
J. Wesley Dale
INVENTOR
James W. Hughes
BY
ATTORNEY

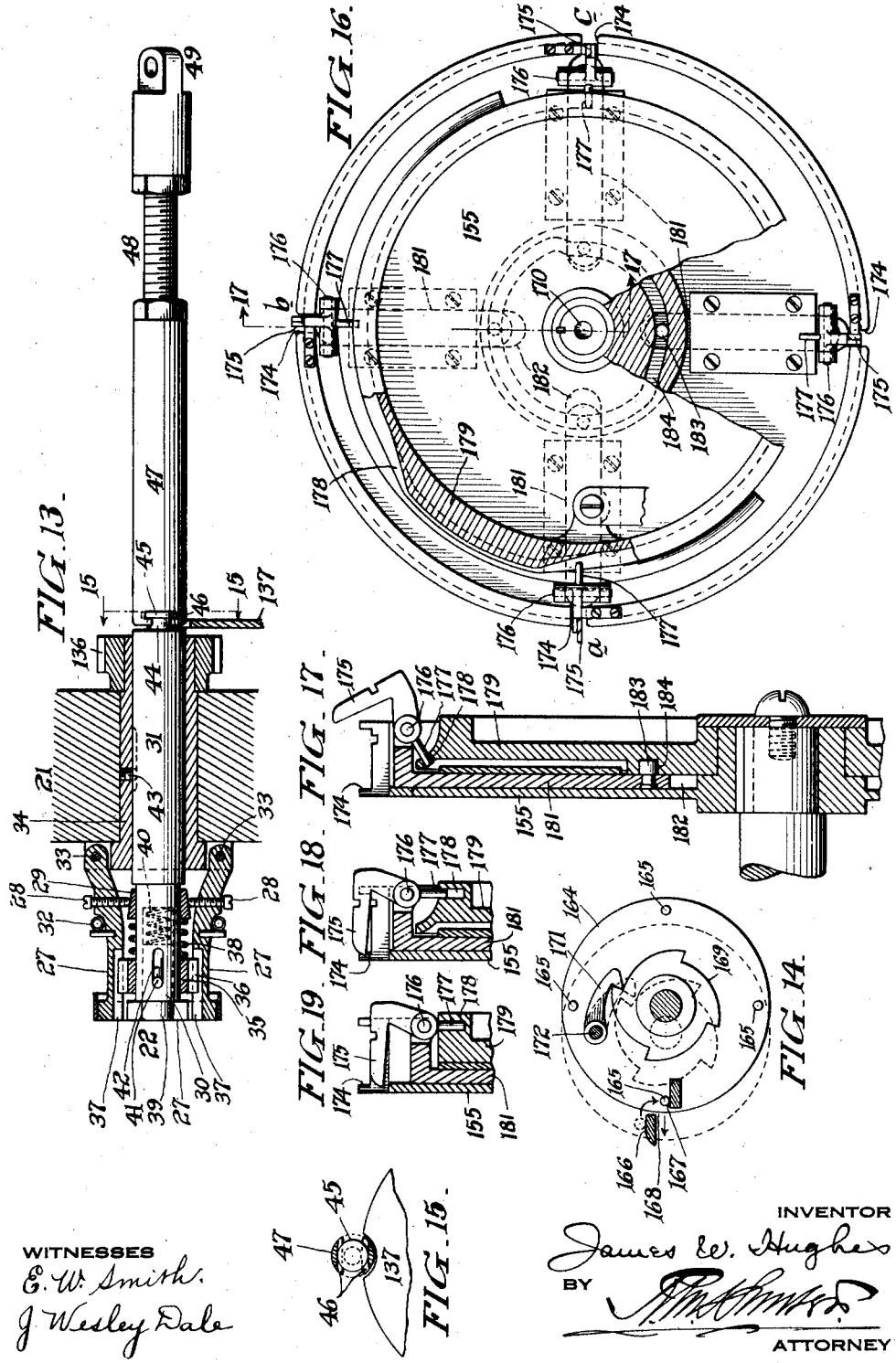

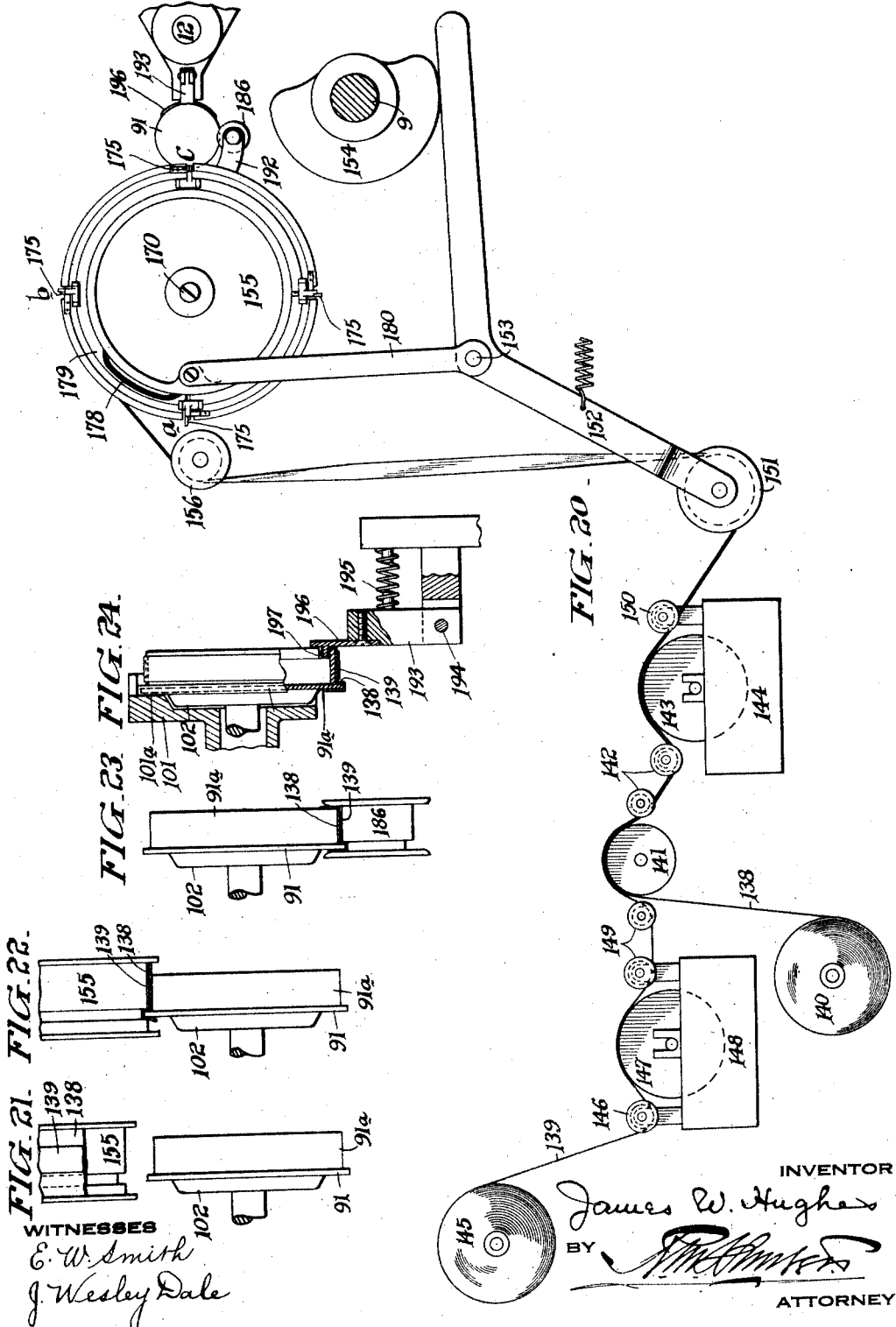

UNITED STATES PATENT OFFICE.

JAMES W. HUGHES, OF HADDON HEIGHTS, NEW JERSEY, ASSIGNOR TO SAMUEL NELSON AND ISAAC AVART, BOTH OF PHILADELPHIA, PENNSYLVANIA.

BOX-MAKING MACHINE.

1,401,407.  Specification of Letters Patent.  Patented Dec. 27, 1921.

Application filed December 4, 1915. Serial No. 64,973.

*To all whom it may concern:*

Be it known that I, JAMES W. HUGHES, a citizen of the United States, and resident of Haddon Heights, county of Camden, and State of New Jersey, have invented an Improvement in Box-Making Machines, of which the following is a specification.

My invention has reference to automatic machines employed in the making of cardboard boxes of circular shape, such as pill boxes, etc., and the object of my invention is to provide an organized machine which will automatically assemble the several card-board portions to be associated and unite them by means of covering and trimming strips pasted upon and about the card-board sections for providing a union and an outside finished covering for them, which organized machine shall be rapid in operation, accurate in its results, and capable of producing the article in a perfect and satisfactory condition at a relatively low cost.

In carrying out my invention I employ an intermittently rotating head or turret carrying the plurality of chucks suitable for holding the cylindrical bodies of card-board, said chucks being associated with means for delivering to them in succession cylindrical or ring-shaped bodies in card-board, and also with additional feeding devices for delivering to the end of the chuck carrying such bodies a back or disk of card-board, said feeding devices being spaced apart and in the path of the chucks so that said chucks receive the body at one place and transfer it to another place where the disk or back is received; and I further employ, in association with the means for feeding the disk or back to the chuck, certain plunger appliances for holding the back in position upon the ring-shaped body and applying to the associated back and body a wrapper or covering strip with or without a trimming strip, said means arranged to paste the strip in position about the body and back, tucking one edge over and into the body and the other edge over the flange of the back; and in further association with the aforesaid means I employ a second plunger or clamping part of annular form which presses down and smooths the cover strip at the rear of the back or disk. In further carrying out my invention, I prefer to cause the head carrying the chucks to be intermittently revolved with at least three movements in each revolution of the head or turret, and to employ upon said head or turret three chucks which are brought in succession into the positions for receiving the body, applying the disk or back and the pasted covering, and finally to discharge the finished article, said three operations taking place at the same time but upon different chucks so as to greatly facilitate the speed of production. I further provide special means for applying the cover strip to the box sections and for delivering the requisite quantity of covering paper to the box sections in succession, together with the organized apparatus for insuring coöperation between the several parts of the strip applying mechanism, the chucks, plungers, and annular clamping portions surrounding said plunger.

With the above and other objects in view, the nature of which will be more fully understood from the description hereinafter, the invention consists in the novel combination of the parts as well as the specific construction of certain features thereof which enter into the organization of my improved box making machine, as hereinafter more fully described and defined in the claims.

Figure 8:
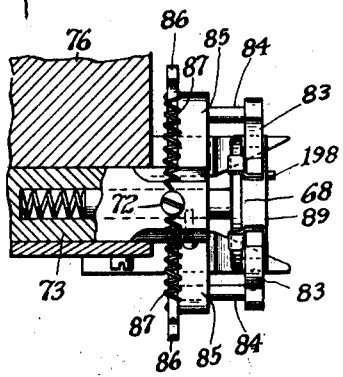
Figure 9:
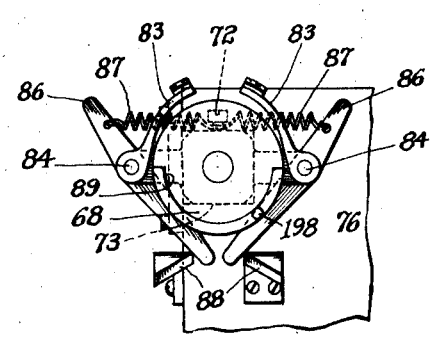

My invention will be better understood by reference to the drawings, in which:— Figure 1 is a side elevation of a machine for assembling the bottom and body portion of a circular box embodying my invention; Fig. 2 is a plan view of the cam shaft with its driving means, and a series of arms moved by the cams for operating various parts of the machine; Fig. 3 is an enlarged plan view of a portion of the machine, referring more particularly to the driving mechanism; Fig. 4 is a section taken on line 4—4, of Fig. 3; Fig. 5 is a section taken on line 5—5 of Fig. 3, which is the same line as 4—4, but looking in opposite direction; Fig. 6 is a longitudinal section of a portion of the machine taken on line 6—6 of Fig. 4; Fig. 7 is a transverse section taken on line 7—7 of Fig. 3; Fig. 8 is a sectional plan view in detail of a portion of the mechanism for delivering the body of the box to the chucks; Fig. 9 is a face view of Fig. 8; Fig. 10 is a side elevation, partly in broken section, of the turret head and feeding mechanism; Figs. 11 and 12, are respectively sectional and face views of the bar for feeding the back or bottom of the box into a position to be fastened to the body of the box; Fig. 13 is a sectional elevational view of one of the expanding chucks, and a portion of the means for operating the same; Fig. 14 is a view in detail of means for stopping the paper feed wheel in a predetermined position; Fig. 15 is a section taken on line 15—15 of Fig. 13, showing the means for putting the chuck shaft into driving connection; Fig. 16 is a sectional elevation of the covering paper feeding wheel and cutting mechanism carried thereby; Fig. 17 is an enlarged section taken on the line 17—17 of Fig. 16. Figs. 18 and 19 are sectional views in detail of two positions of the paper cutting knife; Fig. 20 is a view in elevation of the apparatus for placing the glue on the covering and trimming paper webs, and showing the travel of the webs in their various stages from the rolls until they are applied to the box to complete the same; Figs. 21, 22, 23 and 24 are details showing the manner in which the strips or webs of paper are delivered upon the body and bottom of the box to unite them; and Fig. 25 is a front elevation of a portion of the feeding devices for the box bodies.

1 designates the bed of a machine, the legs of which are not shown. Mounted on the bed are the standards 2 and 3, also the base 4 upon which is the standard 5. A bracket 6 is secured on the bed 1 for supporting bearings in which the cam shaft is journaled.

I prefer to drive the machine from any suitable power, and for this purpose I have provided the tight and loose pulleys 7 and 8, mounted on one end of a shaft 9. This shaft 9 is supported by the standards 2 and 3. A driving pinion 10 is secured to the shaft 9, and is in mesh with a gear 11, loosely mounted on a shaft 12, as clearly illustrated in Fig. 6 of the drawings. The gear 11, through an idler gear 13, drives a gear 14 secured upon a shaft 15 journaled in the standards 2 and 3 and in the bracket 6. A bevel gear 16, secured upon the shaft 15, meshes with a bevel gear 17 on one end of the cam shaft 18, upon which are also mounted various cams for operating what may be designated as the feeding mechanism of the machine.

On the left end of the shaft 12 as viewed in Fig. 1, but best seen in Fig. 6, is a Geneva gear 19, which is operated by a pin 20 provided with a roller to reduce the friction. This pin 20 is mounted on the tight driving pulley 7 in such a manner that it will engage the slots in the Geneva gear 19 to cause intermittent rotation of the same and its shaft 12. A turret or head 21 is secured to the opposite end of the shaft 12, and receives an intermittent movement by reason of the intermittent action of the gear 19. On the turret 21 I have mounted three chucks 22, arranged equidistant from each other and from the axis of the turret, and operating so that they may receive and deliver the boxes, or parts thereof as required. While I have shown three chucks, I do not limit myself to this number, as more or less may be employed according to the design of the machine. For instance, I have shown three points of operation A, B and C. The body of the box is received at A, assembled with the back or bottom and covering paper web at B, and delivered from the machine at C. It will be manifest, however, that the assembled and covered box may be delivered at B, and in this way reduce the number of chucks necessary to two, though I prefer to employ three chucks as shown. From experience, I have found the three points of operation to be very successful, and so have shown the use of such a number in this preferred form of my invention.

When a chuck 22 has arrived in each of the positions A, B, and C, it is necessary to hold the turret very rigidly in position, and for this purpose I have provided a cam groove 23 in the hub of the gear 11. Extending into the groove of this cam is a latch 24, carrying a pin 25, which has a sliding movement in the standard 2, as clearly shown in Fig. 6. A plurality of holes 26, (in this instance three), are drilled into the rear surface of the Geneva cam 19, and are adapted to receive the end of the pin 25 when the chucks 22 are brought into their proper positions A, B and C by the turret 21. It will thus be seen that as the movement of the turret is controlled by the gear 19, a locking of the gear will cause a like condition of the turret. The gear 19 will remain in a locked position until the pin and roller 20, carried by the driving pulley 7, has passed from the position shown in Fig. 4, downward and around the axis of the shaft 9, and enters the next slot of the Geneva gear 19 which is in a position to receive it. At this time the cam 23 will operate to withdraw the pin 25 from the hole 26 and allow rotation of the gear 19, shaft 12 and turret 21.

The chucks 22 are of an expansible construction (best shown in Figs. 10 and 13), and as they are all alike, I will confine my description to one, the same reference characters applying to all. Each chuck has four pivoted arms 27, into which adjusting screws 28 are placed to determine the amount of expansion of the chuck. These screws pass through the arms 28, and the inner ends bear against a tapered collar 29, by means of a circular coil spring 32 extending about the arms. The collar is loosely mounted upon a reduced end 30 of a shaft 31. The arms 27 are pivoted at 33 to a bushing 34, rotatably journaled in the turret 21. A collar 35 is mounted on the reduced end 30 of the shaft 31, and has lugs 36 in engagement with grooves 37, formed in the inner faces of the ends of the arms 27 for the purpose of taking objectionable circumferential strain off the arms. A coil spring 38 between the collar 35 and the tapered collar 29 tends to keep the latter against the inner ends of the adjusting screws 28 and cause the arms 27 to tend to spread outward to expand the chuck.

The end of the shaft 31 within the reduced portion 30, is drilled to receive a pin 39 seated against a coil spring 40. The pin 39 carries a transverse pin 41 adapted to slide in a slot 42 in shaft portion 30, so that the pin 39 will not be ejected by the spring 40. The use of the said pin 39 is to assist in the discharge of the finished box from the machine, and its operation will be more fully described hereinafter.

The shaft 31 has a sliding movement in the bushing 34, and revolves with it due to the slot and key shown at 43. On the rear end of the shaft 31 is a reduced or neck portion 44, and a head 45, the latter engaging a transverse slot 46 in a rod 47, which is guided in the standard 3. In connection with the rod 47 I provide an adjustment 48, and a lug 49, for the purpose of a jointed engagement with the upper end of a lever arm 50 (Fig. 5). Said arm is mounted on one end of a shaft 51 supported in suitable bearings 52, on an extension 53, which projects from the standard 3. To the opposite end of the shaft 51 is secured a second lever arm 54, the outer end of which carries a roller 55 operating in a slot 56 of a cam 57 (Fig. 1), which is mounted upon the shaft 9.

During the operation of the machine, a chuck 22 is brought into the position A, to receive the circular body portion of a box, and as the cam 57 is revolved, it operates upon the roller 55 causing a rocking movement of the shaft 51, and through the lever arm 50 a longitudinal movement of the rod 47, first toward the chuck to collapse it, and then away from the chuck to expand it. The rod 47 having been connected to the shaft 31 by means of the head 45 and slot 46, causes a like movement of the said shaft. The collar 35 bearing against the coil spring 40 brings the tapered collar 29 against the ends of the screws 28, expanding the four arms 27 of the chuck, until their free ends engage hard against the inner side of the circular body or ring portion of the box, which has been placed upon them at the time the chuck is collapsed. The chuck now remains expanded until the box is completed and ready to be delivered from the machine at C. This is accomplished by reason of a circular disk 137 (Figs. 3 and 10), mounted on the standard 3, and having its periphery lying between the rear shoulder of the shaft 31 and the head 45. It will thus be seen that the chuck will remain in an expanded condition until released by a movement to the left of the shaft 31, as clearly illustrated in Fig. 13. Notches 137$^a$ are provided in the disk 137 at the points A and C for the passage of the rods 47 and 209 during the collapsing and expanding of the chucks. The head 45 on the end of the shaft 31 is free to disengage from the rod 47 at any time when the chuck is expanded, such disengagement being caused by rotation of the turret 21 about its axis.

The circular bodies of the boxes are fed into the machine by a continuous conveyer belt 58, incased in an oblong trough 59 (Fig. 1). The conveyer passes over the rollers 60, one of which is driven by a pulley 61 and belt 62, the latter receiving its power from a pulley 63 mounted on the cam shaft 18. A cam actuated lever 64 is pivoted at 65 to a table 74, and is held in its normal position in front of the trough 59 by means of a coil spring 64$^a$ (Fig. 10). This lever is moved by the cam 66 on the shaft 15, and allows one body of a box to be discharged from the trough into the chute 67, for delivery into a plunger head 68, as best seen in Fig. 10. The bottom of the chute 67 is provided with slots through which project pins 69, carried on a rocking beam 70. A tongue 71 is attached to one end of the beam 70 and bears against the head of a screw 72 mounted on a sliding bar 73. Reciprocation of the bar 73 will cause a rocking movement of the beam 70, and alternates the projection of first one set of pins 69 through the slots in the chute, and then the other set. This causes a step by step feeding of the boxes through the chute 67 and into the plunger head 68. The chute 67 and the conveyer are mounted on the table 74, which is supported upon legs 75, projecting upwardly from the block 76. This block is secured on the upper surface of the standard 5.

The reciprocating bar 73 is attached at one end to a rocking lever 77, pivoted at 78, and carrying a roller 79, contacting with the working surface of a cam 80 mounted on the cam shaft 18 (Fig. 1). The other end of the bar 73 carries the spring pressed plunger head 68, as best seen in Figs. 8 and 9. This head 68, as before described, receives the body portion of the box from the chute 67 and delivers it to the chuck at A. In order that the box will remain secure in the head 68 until it is placed correctly upon the chuck, I provide a spring controlled lever 81 (Fig. 10), pivoted at 82, which bears against the front edge of the head 68. I further provide two curved arms 83 (Fig. 9), secured to the ends of the rods 84, journaled at 85 on the opposite sides of the bar 73.

Levers 86 are secured to the ends of the shafts 84, the upper ends of the levers being connected by springs 87 to the screw 72 on the bar 73. The lower ends of the levers 86 contact with cam surfaces 88 on the block 76, and as the bar 73 is moved forward the cam surfaces 88 permit the springs 87 to draw the upper ends of the levers toward each other and rocking the shafts 84, thus causing the tongs 83 to contact with the box body and clamp the same firmly in the head 68, the body resting upon the flange 89 on the lower edge of the head. As the raised portion of the cam 80 contacts with the roller 79, the head 68 having the box therein, is moved over in front of the end of the chuck 22 at A in alinement therewith, and the chuck is then expanded as described to grip the body. The spring pressed lever 81 (Fig. 10) is pressed forward and downward out of the way by the head 68 as it advances. As the bar 73 returns to its normal position, the cam surfaces 88 will again raise the tongs 83, and allow another box body to be fed from the chute into the head, the head moving slightly farther back than shown in Figs. 8 and 10. The rocking bar 70 (Fig. 10) is controlled by a spring 90 and is mounted on a suitable support secured to one of the legs 75, and the bar 73 which rocks it is suitably supported in guides in the block 76.

The bottoms or backs 91 for the boxes are disk-shaped and are placed in a magazine tube or hopper 92 mounted on the table 74. They are fed forward one at a time by the reciprocating feed plate 93 into a chute 94. The feed plate is reciprocated by the link connection 95, and arm 96, secured to a shaft 97, which is journaled in bearings on the block 76. The opposite end of the shaft 97 carries a slotted arm 98, which is operated by a pin 99 on the bar 73. As the disk 91 is fed into the chute 94, it lands edgewise upon a projection 100 on the top of the receiver 101. This receiver 101 is in alinement with the chuck which has previously received the box body and been moved from the point A to the new position B. As the receiver 101 is moved rearwardly, the disk will drop into it, and in front of a plunger 102. One side of the receiver 101 has been flattened to allow the same to feed up to the chuck, and give sufficient clearance to pass the paper applying wheel. In order that the disk will be sure and seat itself correctly in the receiver 101, I have provided the lever 103 pivoted to the block 76, and having a cam 104, operated upon by a pin 105, said cam 104 being held in engagement with pin 105 by spring 106. The forward end of the lever 103 is notched at 107, into which notch the disk 91 is received and by which it is retained until properly seated in the receiver 101. I also provide a lever 108, the front end of which lies across the face of the receiver 101, and is held in said position by spring 109. This lever 108 performs much the same function as the lever 81 previously described. Suitable guides 110 direct the course of the disk into the chute 94.

The receiver 101 is carried by a reciprocating bar 111, operated by a link 112, which is pivoted to rocking lever 113. This rocking lever is in turn pivoted at 78 and carries a roller 114, which is in contact with the face of a cam 115 mounted on the shaft 18. The levers 113 and 77 are held against the cams 115 and 80 by suitable springs such as 113$^a$ and 77$^a$. The bar 111 is guided in the block 76 on the opposite side to the bar 73, and is hollow to allow a rod 117 to pass through it. This rod 117 is operated independently of the bar 111 by a cam 118, operating on a roller 119, carried by a rocking lever 120 pivoted at 78 and to the top end of which is connected the rod 117. The rocking lever 120 has a spring 120$^a$ to hold its roller against the cam 118. The receiver 101 is cushioned in the bar 111 by means of a coil spring 121, best shown in Fig. 11, but is prevented from revolving by a pin and slot 122. The plunger 102 is also cushioned in the rod 117, and is free to revolve by the friction between the plunger and the face of the chuck, against which the disk is being pressed. A pin 123 working in a circular slot 124, holds the plunger 102 from being displaced by the spring 125.

In order to rotate the chuck at B, I mount on the shaft 9 in close relation to the gear 10, an elliptical gear 126, meshing with a corresponding gear 127 on the shaft 128 (Figs. 3, 4 and 5). The opposite end of this shaft 128 has secured to it a gear 129 meshing with a long idler gear 130 also in mesh with the gear 131 on one end of a shaft 132, journaled in the standard 3. The opposite end of the shaft 132 has secured to it the gear 133 which meshes with and rotates a long pinion 134 mounted on the end of a stud 135 secured in the standard 3. This gear 134 is so located that each of the gears 136, mounted on the bushings 34 for revolving the chucks, will mesh with it as the turret is revolved. Through this train of gears the particular chuck which has been brought into operative position at B will be revolved during the assembly and covering of the box while the remaining chucks at positions A and C will not revolve. The elliptical gears are used so that the revolving of the chuck will be slower at the beginning and finish of the assembling operation and speedier during the intermediate portion of said operation. In this manner the chucks 22 are brought into rotary activity as they are successively moved into the position B, this rotary activity being to insure the applying of the pasted covering and trimming paper webs to the body and back to unite them in finished relation.

The covering paper to be applied upon the box body and back is preferably formed in two superposed webs or strips. The web or strip 138 is the binding or covering strip, and the strip 139 is the finishing or trimming strip. The binding strip 138 is fed from its roll 140 (Fig. 20) over a roller 141 and under suitable guide rolls 142, thence over the surface of a glue applying roller 143, the lower edge of which dips into a glue pot 144. The trimming strip 139 passes from its roll 145 under a guide roll 146, and over the surface of a glue applying roller 147, the lower edge of which dips into a glue pot 148. The paper strip 139 then passes under the guide rolls 149 and is superposed upon the strip 138 and with it passes over the roll 141. The trimming strip 139 is considerably narrower than the covering or binding strip 138, and both strips may be of any desired color. Upon leaving the roll 143, the strips pass under a guide roller 150 and thence under a roller 151 which is carried on one end of a bell-crank lever 152, pivoted at 153 to the standard 3. The opposite end of the lever 152 is operated upon by a cam 154 on the shaft 9. The cam 154 causes the roller 151 to swing about the center 153 and pull the papers 138 and 139 through the gluing operation to cause a slack to be formed in the paper between the roller 151 and the feeding wheel 155, at a time when the paper is being applied to the box body and back. An idle roller 156 is placed in close proximity to the feeding wheel 155 and guides the paper strips into their correct positions upon said wheel with the glued side outward.

The feeding wheel 155 is revolvably mounted on a sliding carriage 157 which is operated by an internal cam 158 mounted on the shaft 128 (Figs. 1, 3, 5 and 7). A roller 159 operates in the groove of the cam 158 and by means of an arm 160 causes rocking of a shaft 161 journaled in a suitable bearing on the standard 3. An arm 162 (Fig. 7) is secured to one end of the shaft 161 and has its other end hingedly attached to slide 157. It will therefore be seen that a movement of the roller 159 in a lateral direction, due to the cam 158, will cause a light movement of the carriage 157 in its guide 163. In order that the feeding wheel 155 will be brought to a stop in the correct position I have secured to its rear face a disk 164 and have secured thereto stop pins 165, (Figs. 3 and 14). On the standard 3, I have provided two stop abutments 166 and 167, the surface of abutment 167 being lower than the surface of abutment 166. In the position shown in Figs. 3 and 14, one of the stop pins 165 is upon the surface of abutment 167, and the carriage 157 carrying the feed wheel 155 is about to be moved toward the chucks and center of the machine. The said pin 165 will move forward through the slot 168 between the abutments (see arrows in Fig. 14), and thus allow the feed wheel 155 to have free rotary movement due to its frictional contact with the assembled box body on the chuck at B, which latter is in a position to be driven by the revolving gear 134.

In order to bring the stop pin 165 from the upper abutment surface 166 to the lower abutment surface 167, I have provided a ratchet wheel 169 on the shaft 170 which is journaled on the carriage 157 and is the axis for the feed wheel 155. A dog 171 is pivoted to an arm 172 secured in a bracket 173 on the stationary standard 3 and engages one of the teeth on the ratchet 169, in such manner that a rearward movement of the carriage 157 will cause a forward rotation of the feed wheel 155 and its pins 165.

I will now refer to Figs. 16 to 19 inclusive, in which are shown the cutting off means for the binding and trimming strips during the feeding of said strips. I prefer to use a feed wheel of such diameter that one-quarter of the circumference will supply enough of the paper strips to bind and trim the assembled body and back of one box. The feed wheel 155 is composed of a flanged pulley having four notches 174 cut crosswise in the periphery thereof, each of said notches adapted to seat the blade of a knife 175, pivoted at 176, and carrying a pin 177 for engaging a slot 178 in a cam 179. This cam is held from revolving by a link 180 attached to the frame 3 at one end and to the cam 179 at the other end, as shown in Fig. 7. The pivot 176 of the knives 175 is formed in an extension of a plate 181, which is slidably mounted in guide ways 182, formed in the rear wall of the feed wheel 155. The lower end of the plate 181 carries a roller 183, which operates in a cam slot 184 to move the plate 181 in a radial direction. In Fig. 17, the plate 181 is shown in its outermost position and the knife 175 is in its open position due to the action of the cam slot 178, so that the paper strips may be fed onto the feed wheel 155. Such a position of the knives would occur at the point a in Figs. 16 and 17 where the paper strips are being delivered to the feed wheel, as shown in Fig. 20.

In Fig. 18, the knife is shown in a position just ready to cut the paper. This position shows the extreme movement of the knife about its pivot 176 due to the movement of the pin 177 in the cam slot 178, such positions being shown at b in Figs. 16 and 18. The actual cutting of the paper is performed by the cam 184 operating upon the roller 183 to cause an inward movement of the slide 181 which carries the knife 175 down into the groove 174. Such position is indicated at c in Figs. 16 and 19.

The cover paper strip is held to the wheel 155 and fed during its rotary motion by the pulling action of the box and chuck and by the slight gripping action of the cutters 175 between the points corresponding to 178 and 175, in Fig. 16, and during the time the cutter is in the position shown in Fig. 18.

A groove 185 is cut in the peripheral surface of the feed wheel 155 and a corresponding notch is formed in the knives, these being to receive the projecting perimeter edge of the box bottom so that the box body may come into close contact with the paper strips on the feed wheel (Figs. 21 and 22). With reference to Figs. 21 to 24 inclusive, I have illustrated the application of the paper strips to the assembled box body and back. Fig. 21 shows the feed wheel 155 ready to be moved toward the box members, and Fig. 22 shows the same just after it is in contact, the paper strips conforming to the shape of the perimeter of the box. Fig. 23 indicates the operation of a presser roller 186, whose function is to press the edges of the paper strip over the back and body (also shown in Figs. 6 and 17). It is necessary to move this roller 186 to and from the box so as to allow the bottom disk 91 to be fed up to the body 91$^a$. To accomplish this, I have provided a cam 187 (Fig. 3) upon which an arm 188 contacts due to the influence of a spring 189, connected to the standard 3 at one end, and to an arm 190 at the other end. The arm 190 is attached to a rock shaft 191, to one end of which shaft is secured the arm 188, and to the other end a lever 192, carrying the roller 186 (Fig. 7). It will thus be seen that the operation of the cam 187 will cause a rocking motion of the shaft 191, and a movement of the roller 186 in the desired direction to or from the box parts on the chuck at point B. The roller 186 when in an operative position against the box will cause quite a pressure (due to the spring 189) upon the paper strips 138 and 139 to press them firmly on the body and bottom of the box, to which they adhere by reason of their glued surfaces. As will be seen upon reference to Fig. 23 of the drawings, a flange of paper extends over the open edge of the box body which projects over the edge of the chuck as indicated in Fig. 13. This paper flange is left so that it may be tucked over the edge and inside the box to give the same a neat appearance. I accomplish this object by providing each chuck 22 with an arm 193 pivoted on a suitable support at 194, and held in an outward position by a spring 195 (Fig. 24). A plate 196 has near its outer end a projection 197 adapted to engage the inner surface of the body portion of the box, and of such a shape as to press upon the paper flange before referred to (Fig. 23), smoothing or ironing it in place upon the inside of the box body (Fig. 24). To relieve the pressure of the spring 195 at the time a box body is being placed on a chuck at the point A, I provide a small projection 198 (Figs. 8 and 9) upon the head 68, so that when the head is moved forward the body of the box will not receive the force of the spring 195 until the chuck has been expanded, after which time the body will readily permit such pressure without displacement.

The bar 111 (Figs. 1 and 11) has two forward movements during the completion of a box, the first of these movements being caused by the small rise 199 on the cam 115, said movement placing the box disk 91 in position against the body of the box (by pressure of part 102) to receive the binding paper strips, and the second movement being caused by the rise 200 on the cam 115, and for the purpose of ironing the binding paper (by part 101$^a$) flat upon the box back, to cause the latter to have a smooth and neat appearance.

The ironing surface 101$^a$ is in annular form and upon the receiver 101 and surrounds the part 102, and these parts are spring pressed against the back of the box and the flanged portion of the binding strips, and as the box is rotated by the chuck the binding strip at the back of the box slides under the ironing surface 101$^a$ and is pressed and smoothed with a fine finish. Furthermore, in the action of these two parts 101 and 102, the general function may be stated as follows:—The part 101 advances together with the part 102, and clamps the box back upon the box body, pressure is then removed from the part 101 and it recedes, and during this period the box back is held upon the body by the part 102. At this time the rim of the back is free to have the binding strip pasted about it as previously described and the flanged portion of the strip pasted against the back. When this is done, the part 101 is again moved forward against the pasted strip and the surface 101$^a$ directly presses upon the pasted binder, and as the box revolves under the stationary part 101$^a$ the ironing action is accomplished. It is therefore seen that the two parts 101 and 101$^a$ act as clamps for the back, and whereas the part 102 may maintain its clamping action throughout the period of application of the binding strips, the part 101$^a$ only comes into action during a portion of that time and preferably immediately before and after the binding strip is being applied.

The box now being completed, the turret is revolved until the chuck carrying the assembled box arrives at the position C, which is discharging point. An arm 201 pivoted to the base 4 at 202 carries a head 203 at its upper end. This head 203 is cushioned against a coil spring 204 on the arm and is held from disengagement by the pin and slot 205. A roller 206 carried by the arm 201 is brought to rotate upon a cam 207 by a spring 208 (Fig. 1), the cam being mounted on the end of the shaft 9. When the head 203 is brought to bear against the completed box by the action of the cam 207, the chuck is collapsed and the box is held between the head 203 and the plunger 39 (Fig. 13). As the head 203 is moved away from the chuck by the action of the cam 207, the box and plunger 39 will follow until the pin 41 reaches the end of the slot 42 in the reduced portion 30 of the shaft 31 (Fig. 13), at which time the box will be discharged into a chute 209 from which it may be caught by a basket or other suitable receptacle.

In order to collapse the chuck at the delivery point C, I provide a cam 210 mounted on the shaft 9. The groove in said cam 210 operates upon a roller 211, carried by an arm 212 to cause rotation of a shaft 213 mounted in a suitable bearing on the projection 53. An arm 214 is secured to the opposite end of the shaft 213 and has pivoted to its free end a rod 215. This rod is a duplicate of the rod 47 and has a sliding movement in the standard 3; and as it is forced forward by the action of the cam 210 it will move the shaft 31 to the left (Fig. 13), and cause a collapsing of the chuck, by reason of the collar 29 moving to the left, and allowing the screws 28 to follow the inclined surface of said collar.

In the foregoing description of construction and operation, I have described the construction and operatoion with respect to a single chuck; but it is to be understood that the said description equally applies to the plurality of chucks carried by the turret, and it is further to be understood that my invention comprehends the use of one or any number of chucks found most convenient in commercial practice.

The operation of the machine is as follows:—A body of the box is fed from the conveyer 58 into the chute 67, from which it is caught by the head 68. This head 68 is then fed forward over the head of the chuck 22, at A, the chuck being collapsed to receive the box body. The chuck is then expanded and the turret revolved until the chuck, with the box body, arives at the position B. During the receiving of a box body 91ª by the head 68, a disk or back 91 has been fed from the hopper 92, and delivered into the receiver 101. It will thus be seen that when the box body arrives at the position B, a disk is in position to be placed and held against it. The binding paper feed wheel 155 is then moved up into frictional contact with the box and the rotation of the said box body and back will cause a rotation of the feed wheel. The glue on the paper strips will cause it to adhere to the box, and about the time a complete cricle of paper has been applied to the box the knife on the feed wheel cuts the paper and the feed wheel withdraws. During this operation of applying the covering or binding paper strips, the receiver 101 is moved back from the cardboard disk to permit the paper to be flanged over the back of the said disk. The receiver 101 is then again moved forward and by its ironing surface 101ª presses the flanged paper firmly and smoothly upon the back of the box, which operation is termed the ironing of the box. The turret is then again revolved and the box is brought to the position C where it is discharged from the machine as before described.

It will be understood that in the organized machine as shown, the mechanism of the several chucks will be performing their respective functions and work at the same time at the several stations or points A, B and C, no chuck coming to its successive station or position without having performed its specific function required at the previous position, and in this way the machine as a whole is enabled to increase its output over what would be possible with the employment of a single chuck.

I have shown certain automatic means for feeding the box bodies and disk-shaped backs to the turrets, and while these simple devices shown are well suited to the requirements, I do not in any manner restrict myself thereto, as feeding devices of any suitable character may be employed in lieu of those shown.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent, is:—

1. In a machine of the character stated, the combination of a revolving turret carrying a plurality of chucks, feeding devices for supplying circular box bodies to the chucks in succession, means for operating the chucks to automatically grasp the box bodies when in position to receive said box bodies from the feeding devices, means for feeding box backs to the chucks of the turret in succession, clamping devices for clamping the box backs upon the box bodies, means for intermittently rotating the turret to successively bring the chucks into position to coöperate with the feeding devices for the box bodies and feeding devices for the backs in succession, means to rotate the chucks when brought into position to coöperate with the clamping devices, and a rotating wheel and intermittently acting means for imparting a partial rotation to the wheel to feed glued binding strips upon the respective box bodies and freely rotatable to apply the glued papers about the bodies and perimeters of the backs during the rotation of the chucks.

2. In a machine of the character stated, the combination of a revolving turret carrying a plurality of chucks, feeding devices for supplying box bodies to the chucks in succession, means for operating the chucks to grasp the box bodies when in position to receive said box bodies from the feeding devices, means for feeding box backs to the chucks of the turret in succession, clamping devices for clamping the box backs upon the box bodies, means for intermittently rotating the turret to successively bring the chucks into position to coöperate with the feeding devices for the box bodies and feeding devices for the backs in succession, means to rotate the chucks when brought into position to coöperate with the clamping devices, means to feed glued binding strips upon and about the respective box bodies and perimeters of the backs and flange the edge of said strip over the back of the box during the rotation of the chucks, and an annular ironing device adapted to be moved forward to iron the flange of the respective strips on the backs of the boxes to smooth the same during their rotation by the chucks.

3. In a machine of the character stated, the combination of a revolving turret carrying a plurality of chucks, feeding devices for supplying box bodies to the chucks in succession, means for operating the chucks to grasp the box bodies when in position to receive said box bodies from the feeding devices, means for feeding box backs to the chucks of the turret in succession, clamping devices for clamping the box backs upon the box bodies, means for intermittently rotating the turret to successively bring the chucks into position to coöperate with the feeding devices for the box bodies and feeding devices for the backs in succession, means to rotate the chucks when brought into position to coöperate with the clamping devices, means to feed glued binding strips upon and about the respective box bodies and perimeters of the backs during the rotation of the chucks, said means comprising a rotatable wheel having upon its perimeter a transverse cutter, means for feeding the glued binding strip to the feed wheel, means to successively reciprocate the feed wheel to and from the respective rotating chucks and the box bodies and backs clamped thereon for applying the glued binding strip upon the perimeter of the box body and back, and devices for automatically operating the cutter to sever the binding strip transversely to its length when said cutter approaches the chucks.

4. In a machine of the character stated, the combination of a revolving turret carrying a plurality of chucks, feeding devices for supplying box bodies to the chucks in succession, means for operating the chucks to grasp the box bodies when in position to receive said box bodies from the feeding devices, means for feeding box backs to the chucks of the turret in succession, clamping devices for clamping the box backs upon the box bodies, means for intermittently rotating the turret to successively bring the chucks into position to coöperate with the feeeding devices for the box bodies and feeding devices for the backs in succession, means to rotate the chucks when brought into position to coöperate with the clamping devices, means to feed glued binding strips upon and about the respective box bodies and perimeters of the backs during the rotation of the chucks, said means comprising a rotatable wheel having upon its perimeter a transverse cutter, means for feeding the glued binding strip to the feed wheel, means to successively reciprocate the feed wheel to and from the respective rotating chucks and the box bodies and backs clamped thereon for applying the glued binding strip upon the perimeter of the box body and back, devices for automatically operating the cutter to sever the binding strip transversely to its length when said cutter approaches the chucks, a loosely rotatable pressure roll shaped to correspond to the peripheral form of the body and back when clamped together, and means for moving said pressure roll to and from the chuck whereby it shapes the glued binding strip closely upon the outer surface of the box body and back said means holding the pressure roll out of contact with the chuck and the box body thereon except when said chuck is being rotated.

5. In a machine of the character stated, the combination of a revolving turret carrying a plurality of chucks, feeding devices for supplying box bodies to the chucks in succession, means for operating the chucks to grasp the box bodies when in position to receive said box bodies from the feeding devices, means for feeding a box back to each of the chucks of the turret in succession after being shiftd by the turret from the position where the box bodies are received to the position where the box backs are applied, clamping devices for clamping the box backs upon the box bodies, means for intermittently rotating the turret to successively bring the chucks into position to coöperate with the feeding devices for the box bodies and feeding devices for the backs in succession, means to rotate the chucks when brought into position to coöperate with the clamping devices, means to feed glued binding strips upon and about the respective box bodies and perimeters of the backs during the rotation of the chucks said means consisting of a rotatable feed wheel having its periphery shaped to correspond to the perimiter of the box body and back when assembled in clamped position on the chuck and having a transversely arranged cutter rotating with the wheel to sever the binding strip transversely of its length, means to move the wheel into and out of frictional engagement with the box body upon the chuck, a cam movable with the feed wheel for operating the cutter during the rotation of the wheel, and means to hold the cam in a relatively stationary position with respect to the rotation of the wheel.

6. In a machine of the character stated, the combination of a revolving turret carrying a plurality of chucks, feeding devices for supplying box bodies to the chucks in succession, means for operating the chucks to grasp the box bodies when in position to receive said box bodies from the feeding devices, means for feeding box backs to the chucks of the turret in succession, clamping devices for clamping the box backs upon the box bodies, means for intermittently rotating the turret to successively bring the chucks into position to coöperate with the feeding devices for the box bodies and feeding devices for the backs in succession, means to rotate the chucks when brought into position to coöperate with the clamping devices, means to feed glued binding strips upon and about the respective box bodies and perimeters of the backs during the rotation of the chucks said means comprising a rotatable wheel having upon its perimeter a transverse cutter, means for feeding the glued binding strip to the feed wheel, means to successively reciprocate the feed wheel to and from the respective rotating chucks and the box bodies and backs clamped thereon for applying the glued binding strip upon the perimeter of the box body and back, devices for automatically operating the cutter to sever the binding strip transversely to its length when said cutter approaches the chucks, and organized associated means for operating the above specified parts in timed relation to cause the delivery of the box body and back respectively to separate chucks at the same time and in succession as to the same chuck, then cause a rotation of the turret to move the chucks through a definite arc, then deliver the back to the chuck carrying the body so moved and clamp the back in position upon the body, then rotate the chuck to cause the box body and back to rotate, then control the movement of the feed wheel to apply the binding strip, then again rotate the turret through a given arc to move the chuck with the finished box to a discharging position and arrest the rotation of the chuck in being moved to said new position, and automatically collapse the chuck to discharge the finished box.

7. In a machine of the character stated, a chuck for holding a box body, a turret for shifting the chuck from one position to another, means for intermittently and automatically expanding and collapsing the chuck governed as to time of action by the movement of the turret, means for intermittently rotating the chuck, means for feeding a box body to the chuck, separate means for feeding a disk-shaped back to the chuck, said feeding means operating intermediate of the rotating periods of the chuck, rotatable clamping devices for clamping the back to the body on the chuck and permitting of its rotation, and means for feeding a glued binding strip upon the peripheral portions of the box body and back during the rotation of the chuck.

8. In a machine of the character stated, a chuck for holding a box body, means for expanding and collapsing the chuck, means for intermittently rotating the chuck, means for feeding a box body to the chuck, separate means for feeding a disk-shaped back to the chuck, said feeding means operating intermediate of the rotating periods of the chuck, rotatable clamping devices for clamping the back to the body on the chuck and permitting of its rotation, and means for feeding a glued binding strip upon the peripheral portions of the box body and back and flanging the said strip over the back of the box during the rotation of the chuck, said feeding mechanism for the disk-shaped back provided with an annular ironing surface surrounding the means for clamping the box to iron the flange of the binding strip.

9. In a machine of the character stated, a chuck for holding a box body, means for expanding and collapsing the chuck, means for intermittently rotating the chuck, means for feeding a box body to the chuck, separate means for feeding a disk-shaped back to the chuck, said feeding means operating intermediate of the rotating periods of the chuck, rotatable clamping devices for clamping the back to the body on the chuck and permitting of its rotation, and means for feeding a glued binding strip upon the peripheral portions of the box body and back during the rotation of the chuck, consisting of a rotatable wheel provided at its periphery with a transverse cutting device, means for shifting the wheel to and from the rotatable chuck, and means for operating the cutter to sever the binding strip when the cutter approaches the chuck.

10. In a machine of the character stated, a chuck for holding a box body, means for expanding and collapsing the chuck, means for intermittently rotating the chuck, means for feeding a box body to the chuck, separate means for feeding a disk-shaped back to the chuck, said feeding means operating intermediate of the rotating periods of the chuck, rotatable clamping devices for clamping the back to the body on the chuck and permitting of its rotation, and means for feeding a glued binding strip upon the peripheral portions of the box body and back during the rotation of the chuck, consisting of a rotatable wheel provided at its periphery with a transverse cutting device, means for shifting the wheel to and from the rotatable chuck, means for operating the cutter to sever the binding strip when the cutter approaches the chuck, a pressure applying roller having flanges and fitting the peripheral portion of the box body and back for flanging the paper strip over the edges of the body and back, and means for tucking one of the flanges of the paper within the box body.

11. In a machine of the character stated, a rotatable chuck adapted to carry a ring-shaped box body, feeding devices in front of the chuck for feeding a disk-shaped back to the chuck and body carried thereon, said feeding means comprising a reciprocating receiver adapted to receive a disk and move it toward the chuck said receiver provided with a centrally arranged spring supported clamping device for clamping the disk-shaped back to the body, and means for imparting independent reciprocating movements to the clamping device and the receiver.

12. In a machine of the character stated, a rotatable chuck adapted to carry a ring-shaped box body, feeding devices in front of the chuck for feeding a disk-shaped back to the chuck and body carried thereon, said feeding means comprising a reciprocating receiver adapted to receive a disk and move it toward the chuck said receiver provided with a centrally arranged spring supported clamping device for clamping the disk-shaped back to the body, and means for imparting independent reciprocating movements to the clamping device and the receiver said means causing a double reciprocation to be imparted to the receiver and a single reciprocation to the clamping device.

13. In a machine of the character stated, a rotatable chuck adapted to carry a ring-shaped box body, feeding devices in front of the chuck for feeding a disk-shaped back to the chuck and body carried thereon, said feeding means comprising a reciprocating receiver adapted to receive a disk and move it toward the chuck said receiver provided with a centrally arranged spring supported clamping device for clamping the disk-shaped back to the body said receiver having an annular ironing surface about the clamping device to iron the back of the box, means for imparting independent reciprocating movements to the clamping device and the receiver, and means for feeding a binding strip to the box body and back carried by the chuck during its rotation.

14. In a machine of the character stated, a turret head, a chuck journaled on the turret head at a distance from its axis, means to intermittently impart rotation to the turret head to cause the chuck to be transferred from one position to another, means to engage the chuck and rotate it at one of the positions only, means to feed a box body to the chuck when in its position of non-rotation said means comprising a guide chute, a reciprocating plunger having at its end a receiving head, pivoted tongs carried with the head for centering the box body upon the head, means to collapse the chuck, means to reciprocate the receiving head and tongs to deliver the box body upon the chuck, means to deliver a back to the chuck and its contained box body when brought to the second or rotatable position, and automatic means for collapsing the chuck when brought to the third or discharging position.

15. In a machine of the character stated, a rotating chuck for carrying a box body, feeding and clamping means to supply a back against the box body held by the chuck and permit of its rotation, a rotatable wheel for feeding a pasted binding strip upon the box body and back during the rotation of the chuck, a plurality of transverse cutters arranged equidistant about the circumference of the wheel, means to reciprocate the wheel to and from the chuck, means to impart an intermittent rotary movement to the wheel during its reciprocation, and cam devices movable with the wheel for controlling the time of operation of the respective transverse cutters.

16. In a machine of the character stated, a rotating chuck for carrying a box body, feeding and clamping means to supply a back against the box body held by the chuck and permit of its rotation, a rotatable wheel for feeding a pasted binding strip upon the box body and back during the rotation of the chuck, a plurality of transverse cutters arranged equidistant about the circumference of the wheel, means to reciprocate the wheel to and from the chuck, means to impart an intermittent rotary movement to the wheel during its reciprocation, cam devices movable with the wheel for controlling the time of operation of the respective transverse cutters, means for feeding a pasted binding strip to the feeding wheel, and means for relieving the strip from tension during the time that the strip is being wrapped about and glued upon the box body.

17. In a machine of the character stated, a rotary chuck, means for delivering a box body to the chuck, means for delivering a back to the chuck and holding it in position while the chuck is rotated, means for feeding a binding strip to the body and back while being rotated by the chuck, a device for tucking the flange of the binding strip upon the inside of the box during the rotation of the chuck normally in operative position, and means for moving the said device for tucking out of operative position when applying the box body to the chuck.

In testimony of which invention, I hereunto set my hand.

JAMES W. HUGHES.

Witnesses:
E. W. SMITH,
R. M. HUNTER.